Aug. 11, 1953   R. W. DUNMIRE   2,648,099
METHOD OF FORMING AIRPLANE CANOPIES
Filed April 22, 1950

INVENTOR.
Robert W. Dunmire
BY
*H. H. Oldham*
ATTORNEY

Patented Aug. 11, 1953

2,648,099

UNITED STATES PATENT OFFICE 2,648,099

METHOD OF FORMING AIRPLANE CANOPIES

Robert W. Dunmire, North Canton, Ohio, assignor to Goodyear Aircraft Corporation, Akron, Ohio, a corporation of Delaware Application April 22, 1950, Serial No. 157,484

3 Claims. (Cl. 18—56)

This invention relates to a method of stretch-forming, in association with a mold, transparent thermoplastic or thermosetting sheets, respectively, into articles such as airplane canopies and the like, and in particular into articles which are substantially without optical distortion.

Hitherto it has been known to improve the optical quality of mold-formed articles made of sheets of polymethylmethacrylate and similar material by subsequent polishing, or by coating the mold with special material to reduce or prevent mark-off. These methods, however, are not very satisfactory because of cost and labor involved without giving optical satisfactory results. It has also been known that in mold-forming such articles cushions between the mold and the work material have been used in an effort to obtain a satisfactory product, but due to the fact that the work sheet and the cushion sheet were not in fixed relationship to one another, nothing prevented their shifting and consequently rubbing against each other during the forming process so that the article usually urned out to be marred and imperfect.

It is the general object of the invention to produce a mold-formed article of transparent thermoplastic or thermosetting sheet material substantially without optical distortion by adhesively but separably uniting, prior to heating and forming, the work sheet with a thermoplastic sheet cushion or cushions of suitable thickness into a laminate to prevent rubbing of the sheets against one another during the forming process to obtain an article substantially without optical distortion.

The aforesaid object of the invention and other objects, which will become apparent as the description proceeds, are achieved by removably attaching to the work sheet, prior to heat-forming an article, a cushion of smooth, pliable, resinous, thermoplastic sheet material of suitable thickness. Representative suitable materials are rubber hydrochloride, polyvinyl alcohol, polyvinyl butyral and synthetic or natural rubber. However, instead of using cushion material in sheet form it may be sprayed on. Adhesion of the cushion material to the work sheet may be accomplished by inherent adhesiveness of the cushion material or, if necessary, by any suitable adhesive, for instance, latex, all of which will readily permit stripping the cushion from the article after forming without leaving thereon any trace thereof. For instance, polyvinyl butyral, which is self-adhesive, provides good success; however, other materials, such as those enumerated in the above group, may be also used for this purpose.

For a better understanding of the invention, reference should be had to the accompanying drawing wherein.

Figure 1:
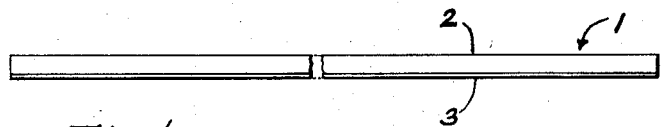
Fig. 1 is an edge view in enlarged scale of a flat laminate consisting of a sheet of work material and of a sheet of cushion material to be formed together in a mold.

With specific reference to the form of the invention illustrated in the drawing the numeral 1, in Fig. 1, indicates in general a flat laminate suitably tailored to produce the article to be formed. The laminate consists of a work sheet 2 made of transparent thermoplastic material, such as polymethylmethacrylate or of transparent thermosetting material, such as copolymers of styrene and an unsaturated alkyd resin, or copolymers of an allyl compound with an unsaturated alkyd resin, which is united by rolling or otherwise with a cushioning sheet 3 made of thermoplastic material, preferably polyvinyl butyral. Polyvinyl butyral is sufficiently tacky to adhere to the highly polished work sheet so that the work sheet cannot shift relative to its cushion while being formed in a mold. Therefore, the work sheet cannot rub on its cushion and be marred or scratched thereby. The cushion 3 will absorb mold mark-off strains and temperature changes which could ordinarily effect the optics of the article. However, after forming, the cushion can be stripped from the article without leaving the slightest trace thereon.

Figure 2:
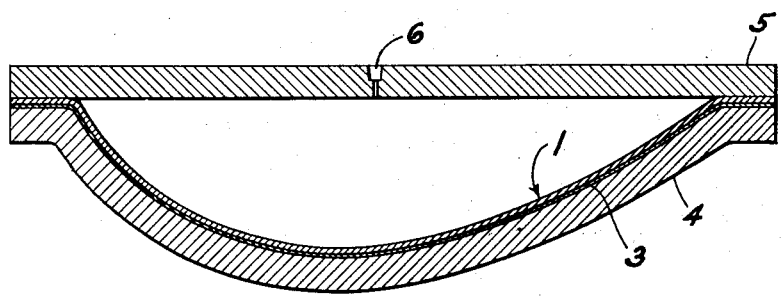
Fig. 2 is a somewhat diagrammatical longitudinal cross-sectional view of a streamlined female mold, together with the laminate formed therein.

In Fig. 2 is shown a female mold 4 over which is draped in heated condition at about 250° to 350° F. the laminated unit 1, with the cushion 3 facing the inner mold surface. With the cover 5 placed on top of the laminate 1 and sealed thereagainst along its edge portion by securing the cover to the mold in conventional manner, usually by quick release clamps, air pressure is applied through the inlet 6 to form the laminate against the mold. After cooling of the formed article the cushion 3 is stripped therefrom leaving a perfectly smooth and optically satisfactory surface thereon.

Figure 3:
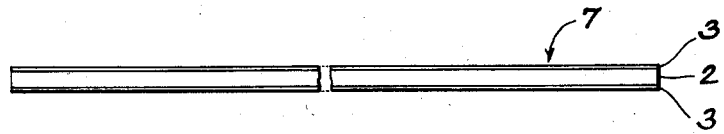
Fig. 3 is a similar view as shown in Fig. 1 of a modified form.

By using a male-female mold, the work sheet 2 is provided at both sides with a protective cushion sheet 3 to form a laminate 7, designated as a whole, as shown in Fig. 3.

Figure 4:
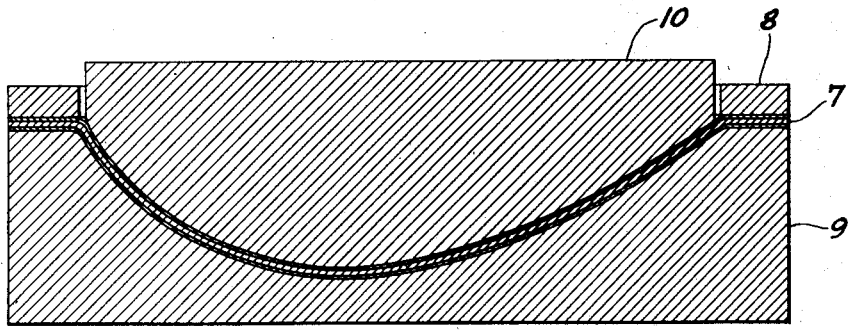
Fig. 4 is a view similar to the one shown in Fig. 2, but for a male-female mold.

In this case the forming process of the work sheet is the same as with the use of only a female mold, except that instead of applying air pressure, the laminate 7 clamped along its edge by the frame 8 against the female mold part 9 is forced thereagainst by the male mold part 10 as shown in Fig. 4.

It will be understood that, if cushion material is used which by itself does not adhere to the work material, a thin coat of latex or of any other suitable adhesive of low adhesive power may be applied to the work sheet and which after the forming process can be separated, together with the cushion, from the article.

From the aforesaid it will be recognized that the process described makes it possible to obtain in a simple and efficient way and at relatively low cost a product of excellent optical quality.

While certain representative embodiments and details have been shown for the purpose of illustrating the invention, it will be apparent to those skilled in this art that various changes and modifications may be made therein without departing from the spirit or scope of the invention.

What is claimed:

1. That method of forming an airplane canopy or the like having substantially undistorted optical quality from a flat transparent plastic sheet which softens between about 250° and 350° F. including the steps of separably uniting by adhesion into a flat laminate the flat transparent plastic sheet and a protective cushion sheet made of a different thermoplastic material which softens between about 250° and about 350° F., heating the laminate to about 250° to 350° F., stretch-forming the flat laminate with the cushion side against a compoundly curved mold by pressure means, cooling the formed compoundly curved laminate, and stripping the cushion sheet from the article thus formed.

2. That method of forming an airplane canopy or the like including the steps of adhesively uniting into a flat laminate a flat transparent polymethylmethacrylate work sheet with a separable self-adherent smooth cushion sheet made of polyvinyl butyral, heating the laminate to about 250° to 350° F., stretch-forming the flat laminate with the cushion side against a compoundly curved mold by air pressure, cooling the formed compoundly curved laminate, and stripping the cushion sheet from the article thus formed.

3. That method of forming an airplane canopy or the like having substantially undistorted optical quality from a flat transparent plastic sheet which softens between about 250° and 350° F. including the steps of separably uniting by adhesion into a flat laminate the flat transparent plastic sheet and a protective cushion sheet made of a different thermoplastic material which softens between about 250° and about 350° F., said adhesion being effected by a coating of latex between the plastic sheet and the cushion sheet, heating the laminate to about 250° to 350° F., stretch-forming the flat laminate with the cushion side against a compoundly curved mold by pressure means, cooling the formed compoundly curved laminate, and stripping the cushion sheet from the article thus formed.

ROBERT W. DUNMIRE.

References Cited in the file of this patent

UNITED STATES PATENTS

| Number | Name | Date |
|---|---|---|
| 953,175 | Moh | Mar. 29, 1910 |
| 2,293,914 | Nanfeldt | Aug. 25, 1942 |
| 2,491,097 | Feagin | Dec. 13, 1949 |